US012793045B2

(12) United States Patent
Spivack et al.

(10) Patent No.: US 12,793,045 B2
(45) Date of Patent: Nov. 10, 2026

(54) DIGITAL WALLET MANAGEMENT

(71) Applicant: Concentrix CVG Customer Management Delaware LLC, Cincinnati, OH (US)

(72) Inventors: Chad Alexander Spivack, Fort Lauderdale, FL (US); Shawn Patrick Ennis, Frisco, TX (US); Varun Vipul Lashkari, Ann Arbor, MI (US)

(73) Assignee: Concentrix CVG Customer Management Delaware LLC, Cincinnati, OH (US)

( * ) Notice: Subject to any disclaimer, the term of this patent is extended or adjusted under 35 U.S.C. 154(b) by 0 days.

(21) Appl. No.: 18/401,915

(22) Filed: Jan. 2, 2024

(65) Prior Publication Data

US 2024/0296442 A1 Sep. 5, 2024

Related U.S. Application Data

(60) Provisional application No. 63/488,251, filed on Mar. 3, 2023.

(51) Int. Cl.

*G06Q 20/36* (2012.01)
*H04L 9/00* (2022.01)
*H04L 9/08* (2006.01)

(52) U.S. Cl.

CPC ....... *G06Q 20/3674* (2013.01); *H04L 9/0825* (2013.01); *H04L 9/50* (2022.05)

(58) Field of Classification Search

None
See application file for complete search history.

(56) References Cited

U.S. PATENT DOCUMENTS 11,334,883 B1 * 5/2022 Auerbach ............ G06Q 20/223
2015/0254640 A1 * 9/2015 Cassano ................. G06Q 20/36 705/71

(Continued)

FOREIGN PATENT DOCUMENTS

CN 109214816 1/2019
CN 109934582 6/2019

(Continued)

OTHER PUBLICATIONS

Sigitas K, "Custodial & Non-custodial Wallets Explained", Feb. 12, 2022 (Year: 2022).*

(Continued)

*Primary Examiner* — Patrick Mcatee
*Assistant Examiner* — Timothy Paul Sax
(74) *Attorney, Agent, or Firm* — Dority & Manning, P.A.

(57) ABSTRACT

A computer-implemented method for managing one or more digital wallets is provided. The method includes obtaining, by a computing system of a platform, an end user request to create an end user digital wallet on behalf of the end user; generating, by the computing system of the platform, the end user digital wallet for the end user, wherein generating, by the computing system of the platform, the end user digital wallet comprises obtaining a user private key and a user public key, and generating user authentication information; maintaining, by the platform, the end user digital wallet for the end user; obtaining, by the computing system of the platform, a request from the end user to transfer custody of the end user digital wallet to a recipient; and providing, by the computing system of the platform, the user private key to the recipient.

14 Claims, 5 Drawing Sheets

(56) References Cited

U.S. PATENT DOCUMENTS

| | | | |
|---|---|---|---|
| 2015/0365283 | A1 | 12/2015 | Ronca et al. |
| 2020/0219094 | A1* | 7/2020 | Dikhit .................. H04L 9/0822 |
| 2020/0334674 | A1 | 10/2020 | Youngblood et al. |
| 2021/0027283 | A1 | 1/2021 | Gaddam et al. |
| 2021/0383363 | A1* | 12/2021 | Smirnov ............ G06Q 20/3674 |
| 2022/0405749 | A1 | 12/2022 | Tartan et al. |
| 2023/0350881 | A1* | 11/2023 | Vukich .................. G06Q 10/10 |
| 2023/0376944 | A1* | 11/2023 | Filter ................. G06Q 20/3821 |
| 2024/0195619 | A1* | 6/2024 | Collen ............... G06Q 20/1235 |
| 2024/0265381 | A1* | 8/2024 | Antonino ........... G06Q 20/3674 |
| 2025/0173705 | A1* | 5/2025 | Osborn .............. G06Q 20/3672 |

FOREIGN PATENT DOCUMENTS

| | | |
|---|---|---|
| EP | 3358515 | 8/2018 |
| WO | WO2015/142765 | 9/2015 |

OTHER PUBLICATIONS

International Search Report corresponding to related application PCT/US2024/018089, dated May 31, 2024, 92 pages.

* cited by examiner

DIGITAL WALLET MANAGEMENT

CROSS-REFERENCE TO RELATED APPLICATIONS

This application is a non-provisional application claiming the benefit of priority under 35 U.S.C. § 119 (e) to U.S. Provisional Application No. 63/488,251, filed Mar. 3, 2023, which is hereby incorporated by reference in its entirety.

FIELD

The present disclosure relates to a system and method for managing one or more digital wallets.

BACKGROUND

A digital wallet is a software-based tool that allows users to send, receive, and manage digital assets such as cryptocurrencies, non-fungible tokens (NFTs), and the like. The digital wallet holds a pair of cryptographic keys: a private key, which must be kept secret, and a public key, which can be freely shared. Transactions are signed with the private key and can be verified with the public key. Blockchain technology has, in recent years, rapidly gained popularity in a variety of sectors. With this growth, the need for user-friendly and secure tools for managing digital assets has also grown.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
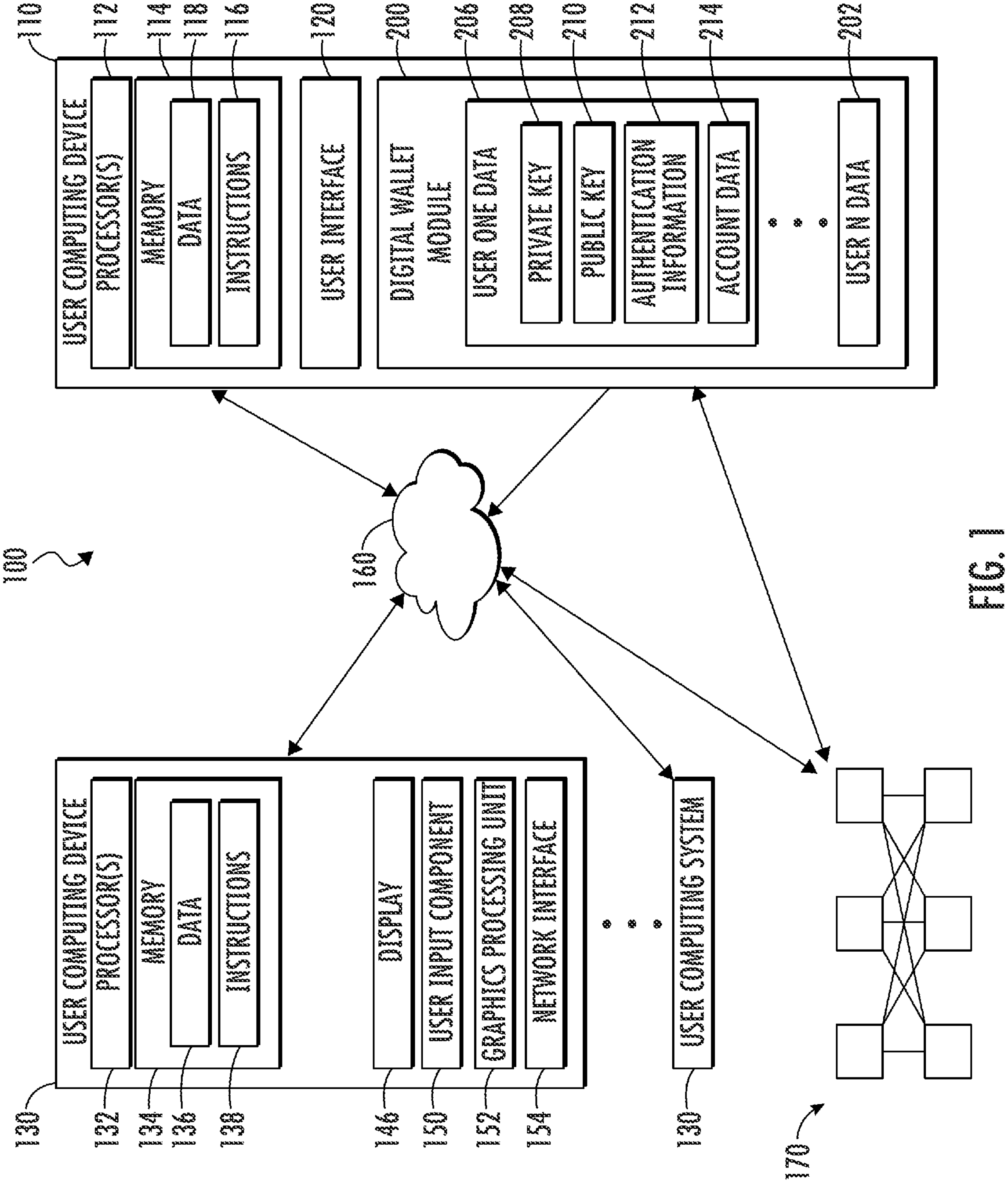
FIG. 1 is an exemplary computing system that can be used to implement a digital wallets management system according to aspects of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The present disclosure relates to a concept of a central business or platform (hereinafter referred to as "the platform") that manages digital wallets for end users, and in particular custodial wallets for end users, and allows the end users to convert the custodial wallets to non-custodial wallets when the end users are ready.

As will be appreciated, a digital wallet is generally a software-based system that securely stores users' digital assets like cryptocurrencies, non-fungible token ("NFTs"), and the like. Digital wallets allow users to manage and conduct transactions using these assets on various blockchain networks. More specifically, digital wallets allow end users to make electronic transactions and can store digital information about currency, such as cryptocurrencies (e.g., Bitcoin, Ethereum, etc.), as well as credit card and loyalty card information.

Each digital wallet is generally accessed using a private key. A private key is a unique, secret alphanumeric codes that enable access to the assets within the digital wallet. They are fundamental to the operation and security of the digital wallet, serving as the cryptographic underpinning for asset control and transaction authorization. The security of these private keys is of utmost importance; loss or compromise of these keys can result in irreversible loss of access to the digital assets by the end user. Given the decentralized nature of cryptocurrencies and the absence of a central authority for recovery, the safeguarding of private keys presents a significant challenge and a potential risk for users.

With a custodial digital wallet (or simply "custodial wallet"), a third-party, like the platform, has control or "custody" over the user's private keys (akin to banks). This setup is advantageous because the user does not have to worry about securing their private key, and as noted above, if a user's private key is lost, there currently is no reliable way to recover the private key, and all assets on the blockchain associated with that private key are essentially unrecoverable. In such a manner, the custodial wallet arrangement offers a safety net against the loss or theft of the keys and provides an easy-to-use interface for those that may be less technically versed.

However, a downside of a custodial wallet is that the end user depends on the platform's security measures and business acumen. For example, if the platform is compromised, so are the user's digital assets. Further, at least certain platforms rehypothecate cryptocurrency assets of their users. Such may have further negative implications for the users of the platform.

On the other hand, a non-custodial wallet allows a user to have sole custody of their private keys. Such an arrangement effectively eliminates a risk of custodial malfeasance. However, the cost is that it places the onus of securing the private key on the user. In particular, while a platform hosting a digital wallet may have a recovery process for a user that loses their authentication data (e.g., user name and password, or the like), if a user of a non-custodial wallet loses their personal key, the asset associated with that personal key are in essentially unrecoverable.

One option for a user is to open a custodial wallet with a platform to learn how the environment of digital transactions associated with cryptocurrencies, NFTs, and the like operate, and once they are comfortable, transfer all of their assets to a new, non-custodial wallet. However, as will be appreciated, particularly in the world of content generation, a user's private and public keys are generally used to identify the creator. Briefly, an end user's public key is generated from the corresponding private key using cryptographic algorithms to ensure the private and public keys are intrinsically linked. However, it is infeasible to reverse-engineer the private key from the public key. In such a manner, the public key (or wallet address) may be shared publicly and used to, e.g., send and receive funds.

For example, when a user creates an NFT or any other transaction on the blockchain, they will sign the transaction with their private key. Anyone can then use an associated public key to verify that the transaction was indeed made by the owner of the private key. This provides security and non-repudiation, as it ties the transaction irrefutably to the owner of the private key. In the case of NFTs, each token is unique and is identified by its own distinct token ID on the blockchain. When a user mints (i.e., creates) an NFT, a record is created on the blockchain that links the NFT to the user's wallet address (or public key), establishing them as the original creator or owner.

In the above option for transitioning from a custodial wallet to a non-custodial wallet, the user must obtain new private and public keys, such that any brand recognition built up with their former public key is lost. Therefore, a need exists to allow a user to transition from a custodial wallet to a non-custodial wallet without losing their private and public keys.

In particular, the present disclosure generally provides for a computer-implemented method for managing one or more digital wallets. The method includes obtaining, by a computing system of a platform, an end user request to create a user digital wallet on behalf of the end user. In response, the method includes generating, by the computing system of the platform, the user digital wallet for the end user. Generating, by the computing system of the platform, the user digital wallet includes obtaining a user private key and a user public key, and obtaining user authentication data. The public key and the user authentication data is provided to the end user. The private key may optionally be provided to the end user. The method further includes maintaining, by the platform, the user digital wallet for the end user. Maintaining, by the platform, the user digital wallet for the end user may include securely storing the private key as a separate and unique private key relative to all other private keys stored by the platform.

Moreover, the method includes obtaining, by the computing system of the platform, a request from the end user to transfer custody of the user digital wallet to a recipient; and in response providing, by the computing system of the platform, the user private key to the recipient.

FIG. 1 depicts an exemplary computing system 100 that can be used to implement a digital wallets management system (system 100) according to aspects of the present disclosure. The system 100 has a platform server architecture that includes a server 110 that communicates with one or more end user computing systems 130 over a network 160.

The server 110 is generally associated with a platform. The platform may be a centralized entity that performs the operations and provides the services described herein, such as custodial wallet services and wallet transfer services (e.g., performs the operations of methods 300, 400). The server 110 may be, for example, a web-based server. The server 110 can be one or more computing devices that are implemented as a parallel or distributed computing system. In particular, multiple computing devices can act together as a single server 110. The server 110 can have one or more processor(s) 112 and a memory 114. The server 110 also includes a network interface 120 used to communicate with one or more remote computing devices (e.g., one or more end user computing systems 130, described below) over a network 160.

The processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by processor(s) 112, including instructions 116 that can be executed by processor(s) 112. The instructions 116 can be any set of instructions that when executed by the processor(s) 112, cause the processor(s) 112 to provide desired functionality.

In particular, the instructions 116 can be executed by the processor(s) 112 to implement a user interface 120, a digital wallet module 200, or both. The user interface 120 can be configured to provide an interface for collecting input data of one or more end users, as will be described in more detail below. In particular, in some implementations, the user interface 120 can be provided for interaction with an end user using an end user computing system 130 that communicates with the server 110 of the platform via the network 160.

Moreover, in some implementations, the user interface 120 can be configured to communicate with the digital wallet module 200. It will be appreciated that as used herein, the term "module" refers to a distinct functional unit or component within a controller or control system (e.g., the server 110) that is devised to perform a specific subset of tasks related to the management and operation of a system as a whole. A module may consist of hardware elements, software routines, or a combination of both, and is configured to integrate and cooperate with other modules within the controller or control system to facilitate desired processing and operational functions. The module may be responsible for various tasks, including but not limited to, receiving input signals, executing predetermined algorithms, and generating output signals, communicating output signals or both.

The digital wallet module 200 may, for example, store data relating to one or more end users (e.g., end user one through end user N); store data relating to one or more digital wallets (each digital wallet associated with a single end user of the one or more end users); obtain (e.g., receive, access, or the like) authentication data, blockchain transaction data, etc. from the one or more end users through the user interface 120; and provide account data to the end users through the user interface 120. In certain exemplary embodiments, the digital wallet module 200 may provide data to a blockchain 170, receive data from the blockchain 170, etc.

In particular, for the embodiment of FIG. 1, the platform hosting the server 110 is arranged as a custodian for the one or more digital wallets associated with the respective one or more end users, e.g., maintaining data of the one or more end users. In particular, with reference to a first end user ("end user one") for example, the digital wallet module 200 of the server 110 stores end user one user data 206, including a user private key 208, a user public key 210, and user authentication information 212. The digital wallet module 200 further separately stores data for each end user of the one or more end user, e.g., up to end user N user data 202. The end user N user data 202 may include the same type of information as the end user one user data 206, but for the respective end user (e.g., private key, public key, and authentication information for end user N). For example, in certain exemplary embodiments, N may be between at least 10, such that the server 110 of the platform is further configured to store unique end user data for end user two, end user three, end user four, end user five, end user six, end user seven, end user eight, end user nine, and end user ten. In other embodiments N may be at least 100 and up to 100 million. In these embodiments, the server of the platform may further be configured to store unique end user data for each individual end user represented by N.

As will be appreciated from the description herein and FIG. 1, the platform hosting the server 110 is configured to separately create and maintain digital wallet data for each of the end users, such that each end user has an individual and unique private key and public key (e.g., user private key 206 and public key 208 for end user one) associated solely with that end user. The user private key and user public key of each end user is stored at a unique location for that specific end user. In such a manner, it will be appreciated that each end user has a custodial digital wallet with the platform hosting the server 110 in FIG. 1. The digital wallet data may be represented at least in part by one or more aspects of the end user data in FIG. 1 (e.g., end user one data 206 may represent a custodial digital wallet for user one).

In such a manner, it will be appreciated that the digital wallet module 200 may further allow for the end user to check and receive account data, such as transaction data, balances of digital assets, etc. For example, the digital wallet module 200 may include account data in the stored end user data, and the account data may be provided to the end user through the user interface 120. For example, the digital wallet module 200 depicted includes user one account data 214 in the stored end user one user data 206.

In certain exemplary embodiments, it will be appreciated that the end user may initiate and execute transactions using the server 110, such as using the digital wallet module 200 of the server 110, and the server 110, such as the digital wallet module 200 of the server 110 may provide data to the blockchain 170, receive data from the blockchain 170, etc. associated with the transactions. For example, the digital wallet module 200 may provide data to the blockchain 170 associated with the transaction and associated with the end user digital wallet (e.g., private and public keys) to execute the transaction (e.g., the user private key 206 and public key 210 stored in end user one data 206 for the first user).

Briefly, it will be appreciated that aspects of the digital wallet module 200, such as portions of the end user data, such as end user one user data 206, can be stored in one or more databases. The one or more databases can be connected to the server 110 by a high bandwidth LAN or WAN, or can also be connected to server 110 through the network 160. The one or more databases can be split up so that they are located in multiple locales, or can be co-located.

The server 110 can exchange data with one or more end user computing systems 130 over the network 160. Although two end user computing systems 130 are illustrated in FIG. 1, any number of end user computing systems 130 can be connected to the server 110 over the network 160. The end user computing systems 130 can be any suitable type of computing device, such as a general purpose computer, special purpose computer, navigational device, laptop, desktop, integrated circuit, mobile device, smartphone, tablet, wearable-computing devices, a display with one or more processors coupled thereto and/or embedded therein, or other suitable computing device. Further, an end user computing system 130 can be multiple computing devices acting together to perform operations or computing actions.

Similar to server 110, the end user computing systems 130 can each include a processor(s) 132 and a memory 134. The memory 134 can store information accessible by processor(s) 132, including instructions that can be executed by processor(s) and data. As an example, memory 134 can store data 136 and instructions 138.

The end user computing system 130 can further include various user input devices 150, or input components, for receiving information from a user, such as a touch screen, touch pad, data entry keys, speakers, mouse, motion sensor, and/or a microphone suitable for voice recognition.

Further, the end user computing system 130 can have a display 146 for presenting information, such as account data associated with the end user's digital wallet. The display 146 can be a visual display including a plurality of visual components for providing the graphical elements of the plate user interface to a user. The visual display can include a liquid crystal display (LCD), a light-emitting diode display (LED), a plasma display, an organic light-emitting diode display (OLED), and/or a cathode ray tube display (CRT).

The end user computing system 130 can further include a graphics processing unit 152. Graphics processing unit 152 can be used by processor 132 to provide an intermediary third party interface. In some embodiments, the graphics processing unit 152 can be used by processor 132 to provide an interface to one or more aspects of the server 110.

The end user computing system 130 can include a network interface 154 for communicating with the server 110 over the network 160 (and/or with the blockchain 170). Network interface 154 can include any components or configuration suitable for communication over network 160, including, for example, one or more ports, transmitters, wireless cards, controllers, physical layer components, or other items for communication according to any currently known or future developed communications protocol or technology.

The network 160 can be any type of communications network, such as a local area network (e.g., intranet), wide area network (e.g., Internet), or some combination thereof. The network 160 can also include a direct connection between an end user computing system 130 and the platform server 110. In general, communication between the platform server 110 and the end user computing system 130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

In some implementations, the network 160 can be used to transfer communication between the end user computing system 130 and/or the server 110 to the blockchain 170. The communications can be transaction data or the like.

In some implementations, one or more non-transitory computer readable media that collectively store instructions that, when executed by the one or more processors, cause the blockchain computing system to perform operations can be included in the computing system. In some implementations, the memory components of the end user computing system 130 and the server 110 can include the one or more non-transitory computer readable media. The stored instructions can include instructions that cause one or more of the computing systems to perform operations that can include the methods and processes disclosed herein.

Figure 2:
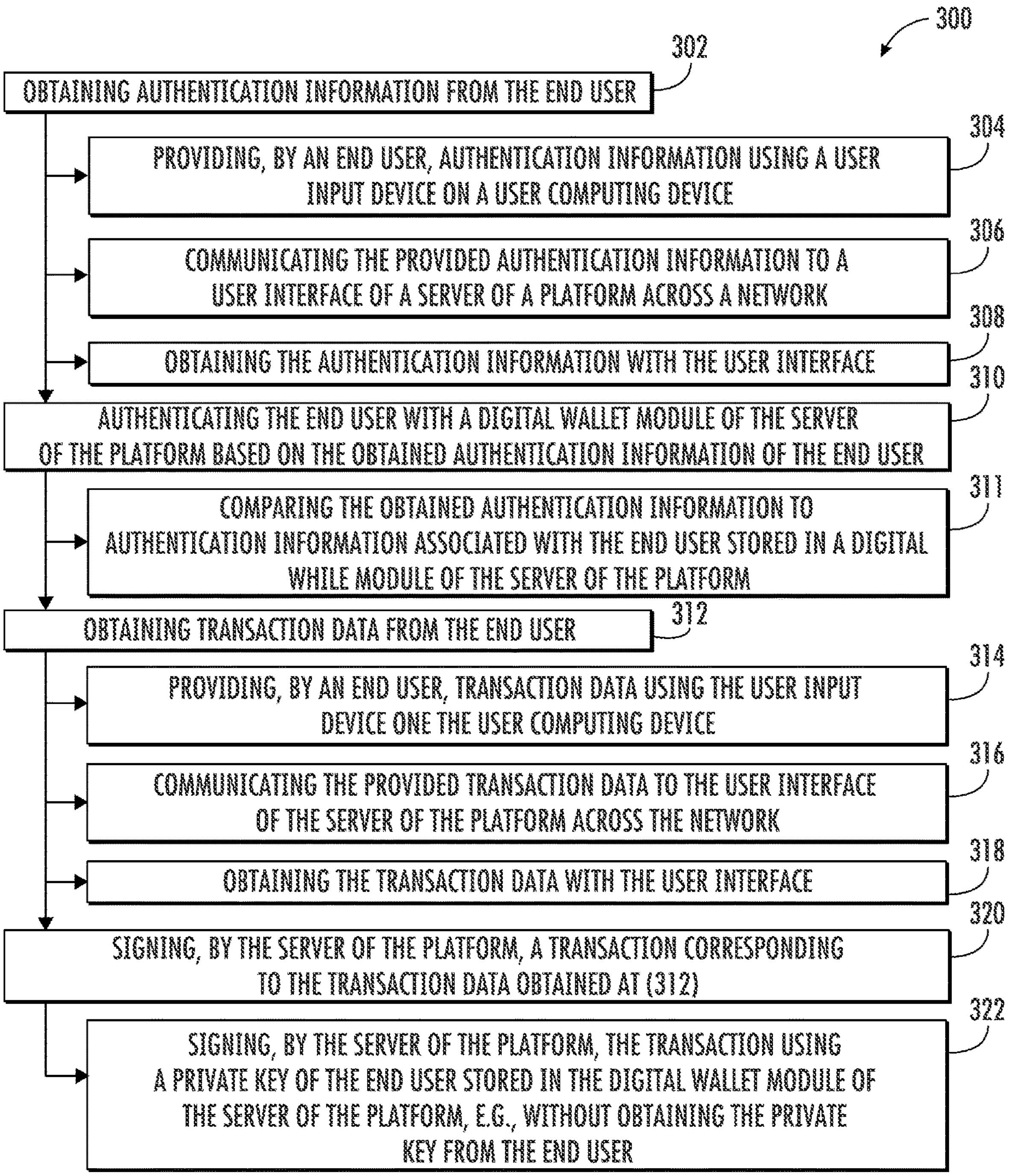
FIG. 2 is a flow chart of a method for executing a transaction in accordance with an exemplary aspect of the present disclosure.

Referring now to FIG. 2, a flow diagram 300 depicting a method for completing a transaction using a custodial digital wallet stored and/or maintained by a server of a platform for an end user, as is depicted in FIG. 1, is provided.

The method 300 includes at (302) obtaining authentication information from the end user. Obtaining authentication information from the end user at (302) includes at (304) providing, by an end user, authentication information using a user input device on a user computing device, at (306) communicating the provided authentication information to a user interface of a server of a platform across a network, and at (308) obtaining the authentication information with the user interface. The authentication information may include a username and password of the end user, but not a private key associated with a digital wallet of the end user.

The method 300 further includes at (310) authenticating the end user with a digital wallet module of the server of the platform based on the obtained authentication information of the end user. In certain example aspects, authenticating the end user at (310) may include at (311) comparing the obtained authentication information to authentication information associated with the end user stored in a digital while module of the server of the platform.

The method 300 further includes at (312) obtaining transaction data from the end user. Obtaining transaction data from the end user at (312) includes at (314) providing, by an end user, transaction data using the user input device one the user computing device, at (316) communicating the provided transaction data to the user interface of the server of the platform across the network, and at (318) obtaining the transaction data with the user interface. In certain exemplary aspects, the transaction data may include a public key or wallet address of a transaction recipient, data indicative of the asset to be transferred (e.g., an amount of cryptocurrency), or the like.

The method 300 further includes at (320) signing, by the server of the platform, a transaction corresponding to the transaction data obtained at (312). Signing, by the server of the platform, the transaction at (320) may include (322) signing, by the server of the platform, the transaction using a private key of the end user stored in the digital wallet module of the server of the platform, e.g., without obtaining the private key from the end user.

Moreover, the method 300 includes at (324) broadcasting, by the server of the platform, the transaction to a blockchain.

In such a manner, it will be appreciated that when the server of the platform stores the end user digital wallet as a custodial wallet, the end user does not need to provide the private key associated with the digital wallet, nor does the end user need to store or otherwise maintain the private key associated with the digital wallet.

Figure 3:
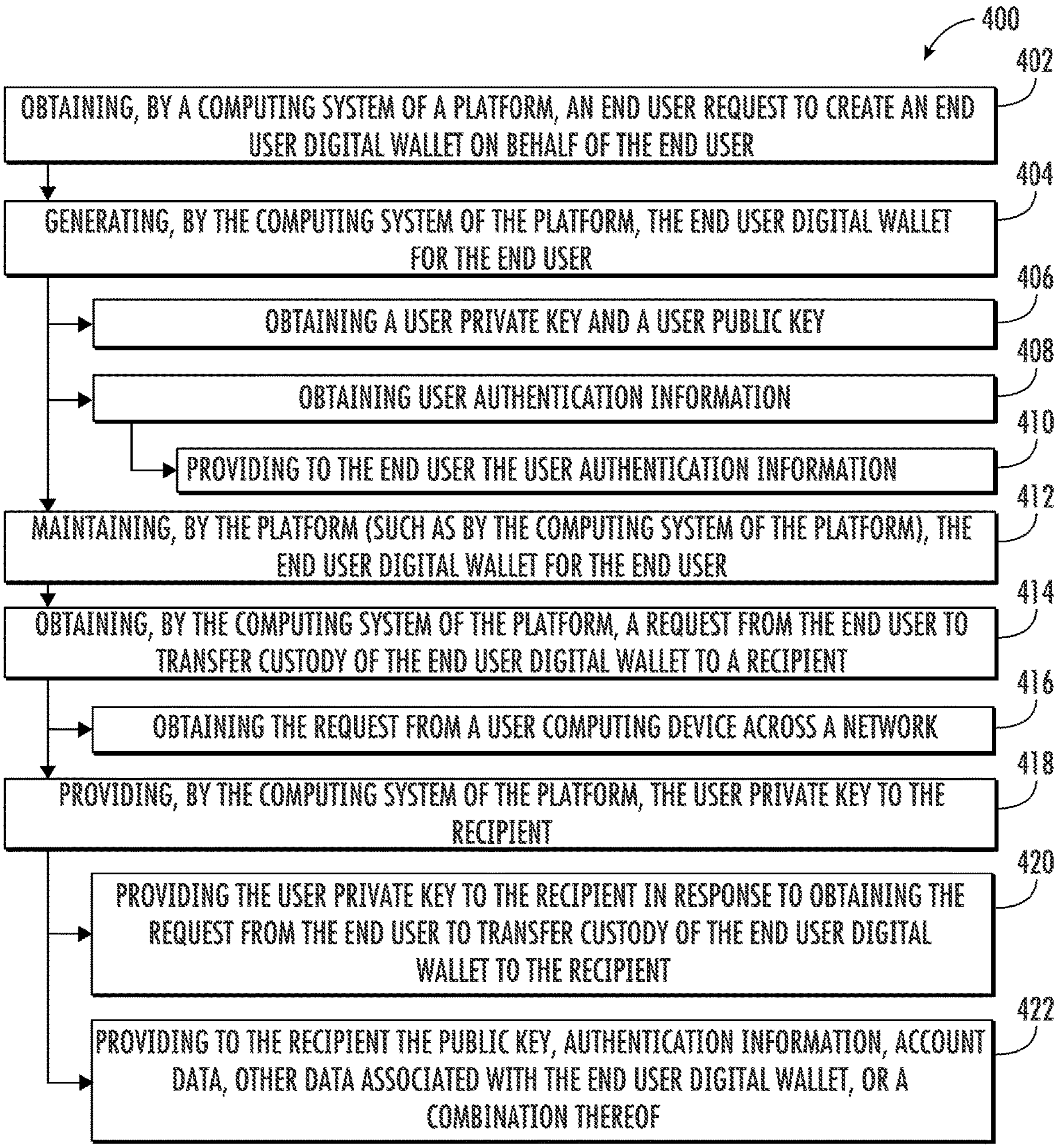
FIG. 3 is a flow diagram of a method for managing one or more digital wallets in accordance with an exemplary aspect of the present disclosure.
Figure 4:
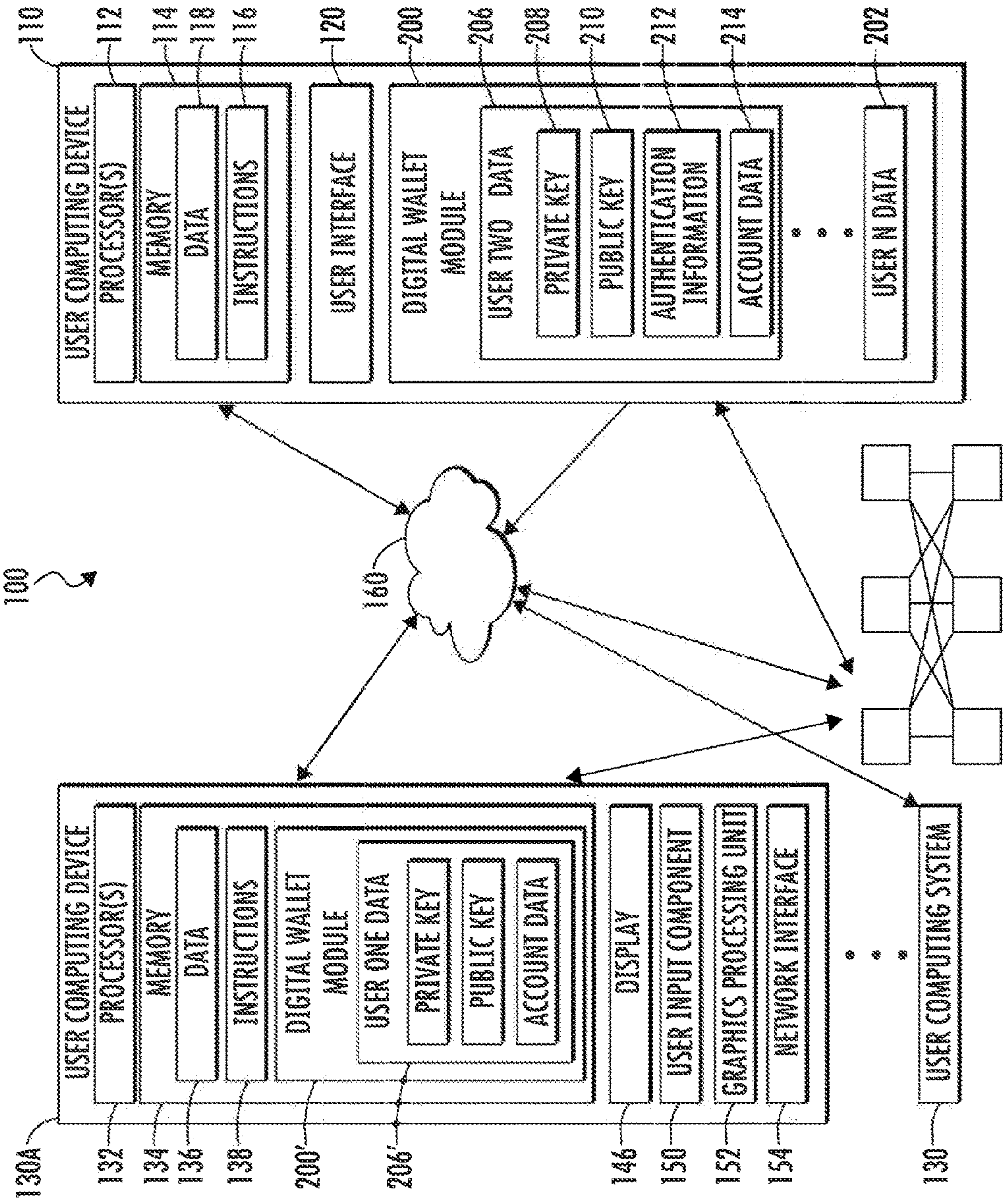
FIG. 4 is an exemplary computing system that can be used to implement a digital wallets management system according to another aspect of the present disclosure.

Referring now to FIG. 3, a flow diagram of a method 400 for managing one or more digital wallets in accordance with an exemplary aspect of the present disclosure is provided. In particular, as noted above, while having a platform maintain a digital wallet for an end user as a custodial digital wallet has certain benefits, there may be certain negative implications as well. Accordingly, the method 400 may be utilized with one or more the exemplary systems and methods described herein (e.g., systems 100 of FIGS. 1 and 4) to transfer custody of a digital wallet of an end user to the end user, transforming the digital wallet from a custodial digital wallet (FIG. 1) to a noncustodial digital wallet (FIG. 4; discussed below).

The method 400 includes at (402) obtaining, by a computing system of a platform, an end user request to create an end user digital wallet on behalf of the end user, and at (404) generating, by the computing system of the platform, the end user digital wallet for the end user. The computing system of the platform may include a server of the platform (see, e.g., FIG. 1).

Generating the end user digital wallet for the end user at (404) includes at (406) obtaining a user private key and a user public key, and at (408) obtaining user authentication information.

Obtaining the user private key and the user public key at (406) may include generating the user private key and the user public key with the computing system of the platform, or may include receiving the user private key, the user public key, or both from a separate computing system (such as a third-party computing system) in response to providing, by the computing system of the platform, a request to the separate computing system to generate the user private key, the user public key, or both.

The user private key and the user public key obtained at (406) may be obtained specifically for the end user and may only be associated with the end user digital wallet of the end user.

Obtaining the user authentication information at (408) may include obtaining the user authentication information from the end user, generating the user authentication information with the computing system of the platform, or a combination thereof. For exemplary aspects in which obtaining the user authentication information at (408) includes generating at least in part the user authentication information, obtaining the user authentication information (408) may include at (410) providing to the end user the user authentication information. The user authentication information may include a username and a password, two factor authentication information, or other identifying information.

In at least certain exemplary aspects, generating the end user digital wallet for the end user may include providing, by the computing system of the platform, the public key associated with the user private key of the end user digital wallet to the end user.

Referring still to the method 400 of FIG. 3, the method 400 further includes at (412) maintaining, by the platform (such as by the computing system of the platform), the end user digital wallet for the end user. Maintaining the end user digital wallet for the end user at (412) may include storing in user data associated with the end user digital wallet, and maintaining the end user data separate from end user data of other end users and separate from end user digital wallets of other end users. In such a manner, the user private key associated with the end user digital wallet may be solely associated with the end user digital wallet of the end user, and the end user digital wallet may be solely associated with the end user. In such a manner, the user private key, the end user digital wallet, or both may not be shared across multiple end users.

Further, the method 400 further includes at (414) obtaining, by the computing system of the platform, a request from the end user to transfer custody of the end user digital wallet to a recipient. In certain exemplary aspects, the recipient may be the end user.

Alternatively, however, in other exemplary embodiments, the recipient may be an individual or entity separate from the end user.

In certain exemplary aspects, obtaining, by the computing system of the platform, the request from the end user to transfer custody of the end user digital wallet to the recipient at (414) may include at (416) obtaining the request from a user computing device across a network.

The method 400 includes at (418) providing, by the computing system of the platform, the user private key to the recipient. In particular, providing the user private key to the recipient and (418) includes at (420) providing the user private key to the recipient in response to obtaining the request from the end user to transfer custody of the end user digital wallet to the recipient. Further, providing the user private key to the recipient at (418) further includes at (422) providing to the recipient the public key, authentication information, account data, other data associated with the end user digital wallet, or a combination thereof.

In such a manner, it will be appreciated that providing the user private key to the recipient at (418) includes at (424) providing custody of the end user digital wallet to the recipient. As will be appreciated, one or more of steps (418)-(424) may be enabled by the generation and maintenance of the end user digital wallet unique for the end user, not having certain shared information (e.g., private keys) with other end users of the platform.

Referring now to FIG. 4, an exemplary computing system 100 that can be used to implement a digital wallets management system in accordance with another example aspect of the present disclosure is provided. The system 100 may, in certain exemplary aspects, be configured in a similar manner as the exemplary system 100 of FIG. 1, following a providing of a user private key to a recipient (see, e.g., steps (418)-(424) of the method 400 in FIG. 3).

In such a manner, it will be appreciated that the system 100 includes a platform server architecture that includes a server 110 that communicates with one or more end user computing systems 130 over a network 160.

The exemplary aspect of FIG. 4, the end user computing systems 130 includes user one computing system 130A, which may be configured in a similar manner as the exemplary end user computing system 130 described above with reference to FIG. 1. As is depicted, the end user computing system 130A includes one or more processors 132 and memory 134. In addition, the user one computing system 130A includes a digital wallet module 200'. The digital wallet module stores user one digital wallet data, or rather end user one user data 206', with the end user one user data 206' including a user one private key 208', a user one public key 210', and user one account data 214'.

In such a manner, it will be appreciated that the end user one user data 206' may have been obtained from the digital wallet module 200 of the server 110 (compare with the digital wallet module 200 of FIG. 1). Notably, in the embodiment shown, the digital wallet module 200 of the server 110 not longer contains user one digital wallet data (but may maintain, e.g., end user two user data 204, end user N user data 202). Accordingly, the server 110 may have deleted the end user one user data 206 (compare with the digital wallet module of FIG. 1).

The user one computing system 130A may be in sole custody of user one, and as such, the digital wallet of user one may be referred to as a non-custodial digital wallet. In such a manner, user one can sign transactions directly on a blockchain using end user one user data 206' (e.g., the user one private key 208' and the user one public key 210'). The end user (user one), in such a scenario, has the complete autonomy of managing their wallet, thereby embracing the decentralization principle of cryptocurrencies while having total control of their private key.

Figure 5:
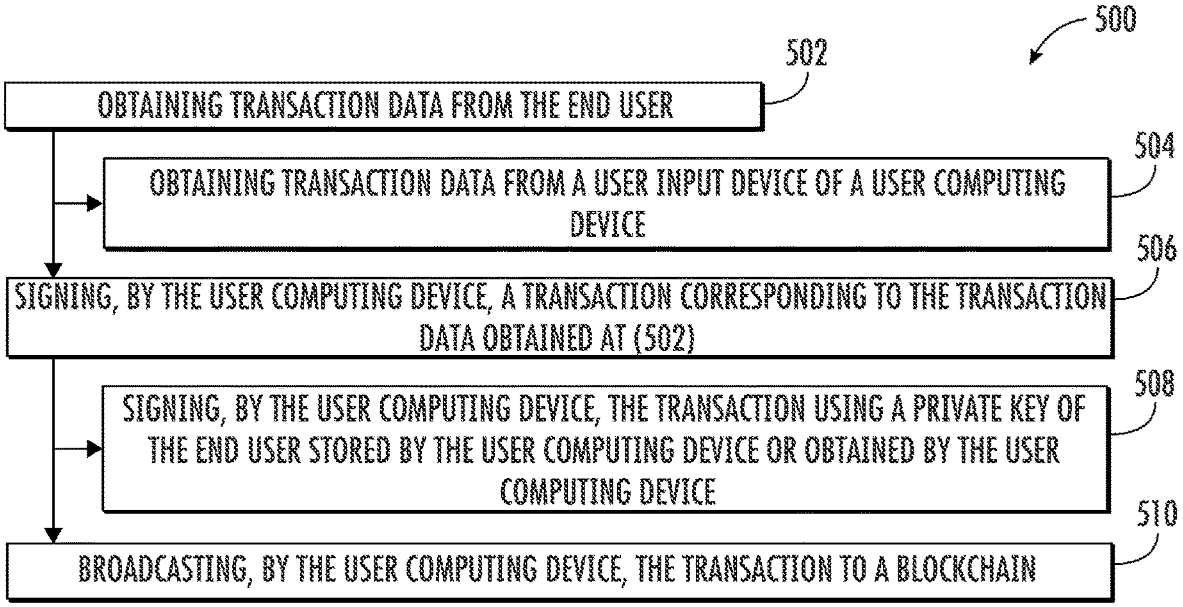
FIG. 5 is a flow chart of a method for executing a transaction in accordance with another exemplary aspect of the present disclosure.

For example, referring briefly to FIG. 5, a flow diagram is provided depicting a method 500 for completing a transaction using a non-custodial digital wallet stored by an end user, e.g., as in the exemplary system 100 depicted in FIG. 4 and described above.

The method 500 includes at (502) obtaining transaction data from the end user. Obtaining transaction data from the end user at (502) includes at (504) obtaining transaction data from a user input device of a user computing device. In certain exemplary aspects, the transaction data may include a public key or wallet address of a transaction recipient, data indicative of the asset to be transferred (e.g., an amount of cryptocurrency), or the like.

The method 500 further includes at (506) signing, by the user computing device, a transaction corresponding to the transaction data obtained at (502). Signing, by the user computing device, the transaction at (506) may include (508) signing, by the user computing device, the transaction using a private key of the end user stored by the user computing device or obtained by the user computing device.

Moreover, the method 500 includes at (510) broadcasting, by the user computing device, the transaction to a blockchain.

In such a manner, it will be appreciated that when the end user digital wallet is arranged as a custodial digital wallet, the end user may be solely responsible for storing and safeguarding the private key associated with the end user digital wallet.

As will be appreciated, the present disclosure offers a unique solution that addresses the challenges associated with both custodial and non-custodial wallets. By providing a relatively seamless transition mechanism, the present disclosure provides end users the flexibility to enjoy the benefits of both wallet types as per their comfort and experience level. In particular, the present disclosure disclosed empowers end users with the freedom to choose the wallet type that best suits their needs, while preserving the security and ease of use associated with custodial wallets, and the autonomy and control of non-custodial wallets. Notably, this is all accomplished without the end user having to change their private key or public key when transitioning custodial wallet arrangement (provided by platform) to the noncustodial wallet arrangement. This approach provides a highly beneficial tool for cryptocurrency users, enhancing the overall user experience and further promoting the adoption of cryptocurrencies.

Further aspects are provided by the subject matter of the following clauses:

A computer-implemented method for managing one or more digital wallets, the method comprising: obtaining, by a computing system of a platform, an end user request to create an end user digital wallet on behalf of the end user; generating, by the computing system of the platform, the end user digital wallet for the end user, wherein generating, by the computing system of the platform, the end user digital wallet comprises obtaining a user private key and a user public key, and generating user authentication information; maintaining, by the platform, the end user digital wallet for the end user; obtaining, by the computing system of the platform, a request from the end user to transfer custody of the end user digital wallet to a recipient; and providing, by the computing system of the platform, the user private key to the recipient.

The method of one or more of these clauses, wherein maintaining, by the computing system of the platform, the end user digital wallet for the end user comprises maintaining, by the computing system of the platform, custody of the user private key.

The method of one or more of these clauses, wherein generating, by the computing system of the platform, the end user digital wallet further comprises, and providing to the end user the public key and the user authentication information.

The method of one or more of these clauses, wherein the user authentication information comprises user login data.

The method of one or more of these clauses, wherein the recipient is the end user.

The method of one or more of these clauses, wherein providing, by the computing system of the platform, the user private key to the recipient comprises removing, by the computing system of the platform, the private key from custody of the computing system of the platform.

The method of one or more of these clauses, further comprising: obtaining, by the computing system of the platform, end user transaction data from the end user; confirming, by the computing system of the platform, the end user initiated a transaction according to the end user transaction data; signing, by the computing system of the platform, the transaction with the user private key; and broadcasting, by the computing system of the platform, the transaction to a blockchain.

A computing system of a platform for managing one or more digital wallets, the system comprising: one or more processors; and one or more non-transitory computer-readable media that collectively store instructions that, when executed by the one or more processors, cause the computing system to perform operations, the operations, comprising: obtaining, by a computing system of a platform, an end user request to create an end user digital wallet on behalf of the end user; generating, by the computing system of the platform, the end user digital wallet for the end user, wherein generating, by the computing system of the platform, the end user digital wallet comprises obtaining a user private key and a user public key, and generating user authentication information; maintaining, by the platform, the end user digital wallet for the end user; obtaining, by the computing system of the platform, a request from the end user to transfer custody of the end user digital wallet to a recipient; and providing, by the computing system of the platform, the user private key to the recipient.

The computing system of one or more of these clauses, wherein maintaining, by the computing system of the platform, the end user digital wallet for the end user comprises maintaining, by the computing system of the platform, custody of the user private key.

The computing system of one or more of these clauses, wherein generating, by the computing system of the platform, the end user digital wallet further comprises, and providing to the end user the public key and the user authentication information.

The computing system of one or more of these clauses, wherein the user authentication information comprises user login data.

The computing system of one or more of these clauses, wherein the recipient is the end user.

The computing system of one or more of these clauses, wherein providing, by the computing system of the platform, the user private key to the recipient comprises removing, by the computing system of the platform, the private key from custody of the computing system of the platform.

The computing system of one or more of these clauses, wherein the operations further include: obtaining, by the computing system of the platform, end user transaction data from the end user; confirming, by the computing system of the platform, the end user initiated a transaction according to the end user transaction data; signing, by the computing system of the platform, the transaction with the user private key; and broadcasting, by the computing system of the platform, the transaction to a blockchain.

One or more non-transitory computer-readable media that collectively store instructions that, when executed by one or more computing devices, cause the one or more computing devices to perform operations, the operations comprising: receiving, by a platform, an end user request to create a user digital wallet on behalf of the end user; generating, by of the platform, the user digital wallet for the end user, wherein generating, by the platform, the user digital wallet comprises obtaining a user private key and a user public key, generating user login data, and providing to the end user the public key and the user login data; maintaining, by the platform, the user digital wallet for the end user; receiving, by the platform, a request from the end user to transfer custody of the user digital wallet to a recipient; and providing, by the platform, the user private key to the recipient.

A computing system of a platform for managing one or more digital wallets, the system comprising: a digital wallet module comprising user data for N number of end users, the user data for each end user being stored separately from the remaining end users, the user data of each end user comprising a private key associated with the respective end user, a public associated with the respective end user, and authentication information associated with the respective end user, the digital wallet module configured to conduct a transaction on behalf of a first end user using user data of the first end user in response to a transaction request obtained by the first end user, the digital wallet further configured to transfer the user data of the first end user to a recipient designated by the first end user in response to a transfer request obtained from the first end user.

The computing system of one or more of these clauses, wherein the recipient is the first end user.

The computing system of one or more of these clauses, wherein the digital wallet module is configured to delete the user data of the first end user concurrently with, or following, the transfer of the user data of the first end user to the recipient designated by the first end user.

The computing system of one or more of these clauses, wherein the transaction request is a cryptocurrency transfer request.

The computing system of one or more of these clauses, wherein the digital wallet module configured to conduct the transaction on behalf of the first end user without receiving the private key of the first end user from the first end user.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A computer-implemented method for managing one or more digital wallets, the method comprising:

obtaining, by a computing system of a platform, an end user request to create an end user digital wallet on behalf of the end user;

generating, by the computing system of the platform, the end user digital wallet for the end user, wherein generating, by the computing system of the platform, the end user digital wallet comprises obtaining a user private key and a user public key, and generating user authentication information;

maintaining, by the platform, the end user digital wallet for the end user;

obtaining, by the computing system of the platform, a request from the end user to transfer custody of the end user digital wallet to a recipient; and providing, by the computing system of the platform, the user private key to the recipient in response to obtaining the request from the end user to transfer custody of the end user digital wallet to the recipient, wherein providing, by the computing system of the platform, the user private key to the recipient comprises removing, by the computing system of the platform, the private key from custody of the computing system of the platform.

2. The method of claim 1, wherein maintaining, by the computing system of the platform, the end user digital wallet for the end user comprises maintaining, by the computing system of the platform, custody of the user private key.

3. The method of claim 1, wherein generating, by the computing system of the platform, the end user digital wallet further comprises, and providing to the end user the public key and the user authentication information.

4. The method of claim 1, wherein the user authentication information comprises user login data.

5. The method of claim 1, wherein the recipient is the end user.

6. The method of claim 1, further comprising:

obtaining, by the computing system of the platform, end user transaction data from the end user;

confirming, by the computing system of the platform, the end user initiated a transaction according to the end user transaction data;

signing, by the computing system of the platform, the transaction with the user private key; and broadcasting, by the computing system of the platform, the transaction to a blockchain.

7. The method of claim 1, wherein the end user digital wallet is converted from a custodial digital wallet to a non-custodial digital wallet upon completion of the obtaining step and providing step.

8. A computing system of a platform for managing one or more digital wallets, the system comprising:

one or more processors; and one or more non-transitory computer-readable media that collectively store instructions that, when executed by the one or more processors, cause the computing system to perform operations, the operations, comprising:

obtaining, by the computing system of the platform, an end user request to create an end user digital wallet on behalf of the end user;

generating, by the computing system of the platform, the end user digital wallet for the end user, wherein generating, by the computing system of the platform, the end user digital wallet comprises obtaining a user private key and a user public key, and generating user authentication information;

maintaining, by the platform, the end user digital wallet for the end user;

obtaining, by the computing system of the platform, a request from the end user to transfer custody of the end user digital wallet to a recipient; and providing, by the computing system of the platform, the user private key to the recipient in response to obtaining the request from the end user to transfer custody of the end user digital wallet to the recipient, wherein providing, by the computing system of the platform, the user private key to the recipient comprises removing, by the computing system of the platform, the private key from custody of the computing system of the platform.

9. The computing system of claim 8, wherein maintaining, by the computing system of the platform, the end user digital wallet for the end user comprises maintaining, by the computing system of the platform, custody of the user private key.

10. The computing system of claim 8, wherein generating, by the computing system of the platform, the end user digital wallet further comprises, and providing to the end user the public key and the user authentication information.

11. The computing system of claim 8, wherein the user authentication information comprises user login data.

12. The computing system of claim 8, wherein the recipient is the end user.

13. The computing system of claim 8, wherein the operations further include:

obtaining, by the computing system of the platform, end user transaction data from the end user;

confirming, by the computing system of the platform, the end user initiated a transaction according to the end user transaction data;

signing, by the computing system of the platform, the transaction with the user private key; and broadcasting, by the computing system of the platform, the transaction to a blockchain.

14. One or more non-transitory computer-readable media that collectively store instructions that, when executed by one or more computing devices, cause the one or more computing devices to perform operations, the operations comprising:

receiving, by a platform, an end user request to create a user digital wallet on behalf of the end user;

generating, by of the platform, the user digital wallet for the end user, wherein generating, by the platform, the user digital wallet comprises obtaining a user private key and a user public key, generating user login data, and providing to the end user the public key and the user login data;

maintaining, by the platform, the user digital wallet for the end user;

receiving, by the platform, a request from the end user to transfer custody of the user digital wallet to a recipient; and providing, by the platform, the user private key to the recipient in response to obtaining the request from the end user to transfer custody of the user digital wallet to the recipient, wherein providing, by platform, the user private key to the recipient comprises removing, by the platform, the private key from custody of the platform.

* * * * *